United States Patent

[11] 3,608,047

| [72] | Inventor | Robert B. Wiggins<br>Green Bay, Wis. |
|---|---|---|
| [21] | Appl. No. | 711,676 |
| [22] | Filed | Mar. 8, 1968 |
| [23] | | Division of Ser. No. 622,993, Mar. 14, 1967, Pat. No. 3,418,925. |
| [45] | Patented | Sept. 21, 1971 |
| [73] | Assignee | Fort Howard Paper Company<br>Original application, Ser. No. 622,993.<br>Divided and this application Mar. 8, 1968, Ser. No. 711,676 |

[54] METHOD OF MANUFACTURING EMBOSSED PAPER PRODUCTS
2 Claims, 7 Drawing Figs.

[52] U.S. Cl. ..................................... 264/286, 264/119
[51] Int. Cl. ..................................... B29d 7/14
[50] Field of Search ........................... 264/286, 287, 284, 119; 161/130, 134; 162/109, 117

[56] References Cited
UNITED STATES PATENTS

| 2,834,809 | 5/1958 | Schutts | 161/130 X |
| 2,856,323 | 10/1958 | Gordon | 161/124 |
| 3,130,412 | 4/1964 | Fox | 161/130 |
| 3,323,983 | 6/1967 | Palmer | 161/362 |

FOREIGN PATENTS

| 415,888 | 1934 | Great Britain | 18/19 |

Primary Examiner—Robert F. White
Assistant Examiner—Richard R. Kucia
Attorney—Bair, Freeman & Molinare ABSTRACT: A method for continuously embossing a pattern in a paper web. A pair of parallel rollers having a nip therebetween provided. The rollers are biased together while the web is between the rollers. Circumferentially alternating strips having an embossing pattern and axial relief grooves at least coextensive in length with the width of the paper web are provided in the outer periphery of one of the rollers. An interengaging embossing pattern is provided in the other roller. The biasing pressure is intermittently relieved between the rotating rollers when the axial grooves are rotated to a position at the nip between the rollers thereby causing the rollers to jump together by the biasing pressure. The impact of the movement is absorbed by the paper web to set the pattern in the paper web.

PATENTED SEP 21 1971  3,608,047

INVENTOR
ROBERT B. WIGGINS

BY Baw, Freeman
& Molinaro

ATTORNEYS 3,608,047

METHOD OF MANUFACTURING EMBOSSED PAPER PRODUCTS

REFERENCE TO RELATED APPLICATION

This application is a divisional application of my copending application U.S. Ser. No. 622,933, Mar. 14, 1967, now U.S. Pat. No. 3,418,925 which has been indicated as being a divisional application Ser. No. 345,411, filed Feb. 17, 1964, now abandoned.

BACKGROUND OF THE INVENTION

FIELD OF THE INVENTION

DESCRIPTION OF THE PRIOR ART This invention relates to Improvements in Art of Manufacturing Embossed Paper Products.

In the manufacture of paper products such as towels it is desirable to perform an embossing operation for the purpose of increasing bulk and softness, and to improve the appearance. It is also desirable that this be accomplished without sacrificing any appreciable amount of strength. Heretofore it has not been possible to successfully emboss with fine pattern lines on relatively heavy toweling stock such as a 30-lb. Kraft and get a well-set design, particularly while using a small diameter roll.

SUMMARY OF THE INVENTION

It is a general object of the present invention to provide a method of embossing on paper products which makes it possible to obtain a well-set design, on both sides of the sheet, with fine pattern lines on a relatively wide web of relatively heavyweight toweling stock.

A more specific object of the invention is to provide a method of manufacturing embossed paper products wherein a novel hammering action is used to set the fine pattern in the paper.

A further object of the invention is to provide a improved embossed paper product manufactured by the improved method.

A further object of the invention is to provide improved method wherein the embossed design on one of the embossing rolls is relieved at intervals in a novel manner with an increase in depth so as to create a fast hammering action, when the rolls are operating at production speeds, for the purpose of setting the pattern in the paper.

A further object of the invention is to provide an improved paper product wherein the paper product has a design comprising rows of spaced ridges or bars separated by relatively narrow unembossed areas which extend in the cross direction of the machine, thereby producing increased strength in the cross direction of the paper as compared with other embossed items.

A further object of the invention is to provide an improved paper towel having a novel pattern including spaced rows of raised ridges or bars which bars extend in the direction of dispensing movement of the towels so that there is contact between adjacent towels only on the surface of the bars and, hence, less friction during dispensing.

With the above and other objects in view, the invention consists of the improvements in the art of manufacturing embossed paper products, and all of its parts and combinations, as set forth in the claims, and all equivalents thereof.

BRIEF DESCRIPTION OF THE DRAWING

In the accompanying drawing, illustrating the improved product and one form of apparatus for producing the same.

DESCRIPTION OF THE PREFERRED EMBODIMENT

Figure 1:
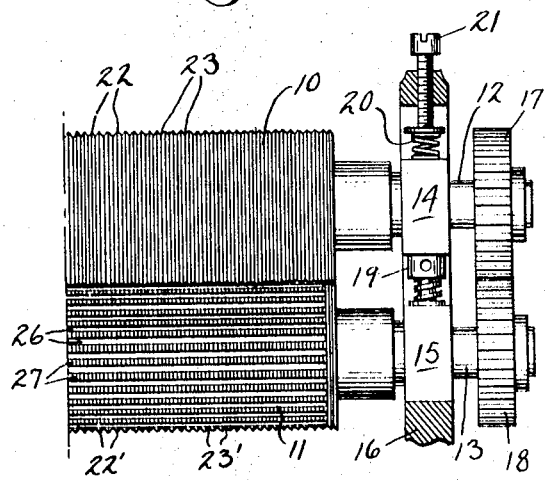
FIG. 1 is an elevational view showing one end of the novel set of embossing rolls.
Figure 2:
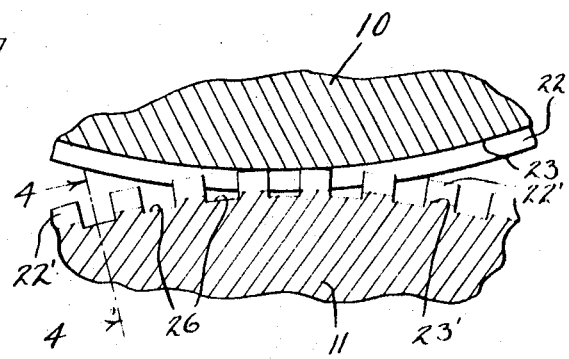
FIG. 2 is a fragmentary transverse sectional view through the rolls, on an enlarged scale as compared with FIG. 1.

Referring more particularly to the drawing, the numeral 10 designates a top embossing roll and the numeral 11 a cooperating bottom embossing roll, both formed of metal. These rolls are suitably mounted on shafts 12 and 13 which are journaled in the conventional way in bearing blocks 14 and 15 at each end, which bearing blocks are suitably supported in spaced upright standards 16, one at each end, forming a part of a conventional embossing frame (not shown). It is to be understood that only a fragment of the length of the rolls 10 and 11 is illustrated in FIG. 1, said rolls being of substantially greater length than is illustrated. One of the shafts is driven from a suitable source and, through the constant mesh gears 17 and 18, which are rigidly mounted on the shafts 12 and 13, the two shafts are driven at the same speed. Projecting upwardly from each bearing block 15 is an adjustable jack 19 of conventional form which can be manipulated to adjust the minimum clearance between rolls. Engaging the top of each bearing block 14 is a pressure loading storing 20 which may be adjusted by means of a screw 21 in the top of the standard 16. It is to be understood that there is an identical frame member 16 at the opposite end, also having an adjustment jack 19 and an adjustable pressure loading spring 20.

Figure 4:
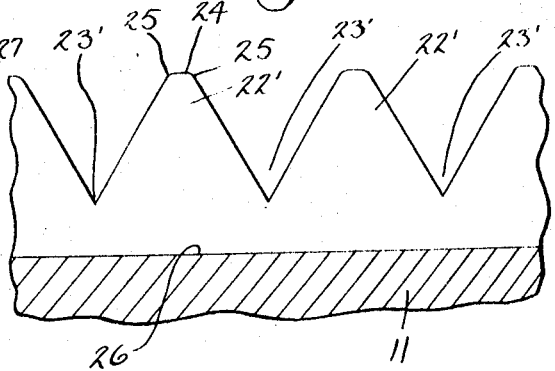
FIG. 4 is a fragmentary sectional view on an enlarged scale taken on the line 4—4 of FIG. 2.

One of the rolls, preferably the top roll 10 as illustrated, has a multiplicity of circumferential ridges 22 separated by circumferential valleys 23. While the ridges may be of varying cross-sectional shape, the ridges on both rolls are preferably of the shape illustrated in FIG. 4 that is, generally inverted V-shape—and the separating valleys 23 on one roll and 23' on the other roll are V-shaped. It is preferred to have the sides of the ridges of both rolls at 60° angle from the horizontal, as is best shown in the sectional view of the lower roller presented in FIG. 4. In the preferred form of the invention the base of each ridge is 0.625 of an inch in width, and the tops of the ridges on both rolls are preferably flattened somewhat for a distance of approximately 0.010 of an inch, as is also best illustrated at 24 in FIG. 4, the cross section of the ridges in the top roll being the same as illustrated in FIG. 4, for the bottom roll. Where the flattened tops 24 join the sloping sides of the ridges there is preferably a slight radius such as 0.010 of an inch as at 25.

There are on the rolls 10 and 11 between 16 and 24 ridges per inch and preferably approximately 18. The depth of the valleys 23 and 23' is preferably 0.046 of an inch.

The bottom roll 11 has mating circumferential ridges 22' separated by grooves 23–, the ridges 22' of the lower roll fitting in the grooves 23 of the top roll.

An important feature of novelty of the present invention resides in the formation of one of the rolls, preferably the lower roll as illustrated, with axial relief grooves 26. These relief grooves preferably terminate just short of the ends of the roll. These relief grooves are preferably ⅛ of an inch wide and they intersect the circumferential ridge so that there are alternating axial relief spaces 26 on the roll 11 where there are no circumferential ridges. Each rigged roll portion 27, between a pair of axial grooves 26, is preferably 3/32 of an inch wide (in a circumferential direction) or of slightly less width than a groove 26. On a 12½-inch diameter roll, there are preferably 180 equally spaced relief grooves. The dimensions and spacings referred to herein are those which have been found to produce the best results of 30-lb. Kraft stock.

The purpose of the above construction is to make it possible to emboss a relatively fine pattern on paper products, such as paper towels, for the purpose of increasing the bulk, softness and appearance. Normally, it would not be possible to gear enough pressure, with the fine pattern illustrated and described herein, using small diameter rolls and a relatively wide web of relatively heavyweight toweling stock such as 30-lb. Kraft. If this were attempted without the features of the present invention the pattern would not become set. In addition, the present invention provides a well-set pattern without sacrificing strength in the cross direction, which direction is normally less strong in an embossed paper.

Figure 5:
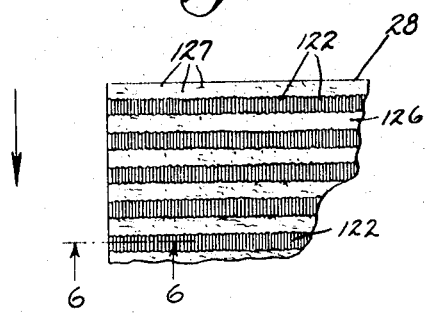
FIG. 5 is a plan view of a portion of a finished product, such as a paper towel, bearing the improved embossed design.
Figure 6:
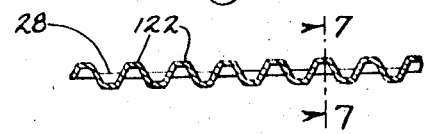
FIG. 6 is a fragmentary sectional view on an enlarged scale taken on the line 6—6 of FIG. 5.
Figure 7:
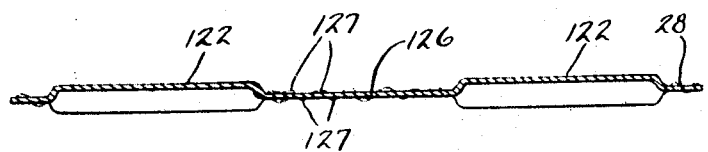
FIG. 7 is a fragmentary sectional view taken on the line 7—7 of FIG. 6.

In operation, when a continuous web of toweling stock, or other paper material of a width no greater than coextensive with the length of the grooves 26 is run between the rolls, it will be embossed with a pattern such as illustrated in FIGS. 5, 6 and 7. In these figures the numeral 28 designates the toweling or other paper product and it will be noted that there are rows of ribs or bars 122 extending in the cross direction of the sheet web, which rows are separated by relatively narrow, unembossed areas or spaces 126 also extending crosswise of the sheet. The ribs 122 project from both sides of the sheet as shown in FIG. 6 to produce a two-way emboss. In the case of toweling, this material may be 30-lb. Kraft. It is to be understood, however, that the process will work on a variety of paper stock but that, normally, there would be a problem in obtaining a well-set pattern when using a stock as heavy as 30-lb. Kraft, which problem is solved by the present invention.

During the embossing of the web of paper, when a row of ridges 27 of the bottom roll are at the nip between the two rolls, the two rolls 10 and 11 are pushed slightly apart against the tension of the springs 21 to permit such engagement. This is due to the fact that the depth of the valleys 23' and 23 is less than the depth of the axial grooves 26, the former being preferably 0.046 of an inch as against 0.056 of an inch for the depth of the axial grooves 26. As soon as one of the axial relief spaces 26 of the bottom roll 11 is at the nip between the rolls the spring tension on the rolls causes the top roll to jump toward the bottom roll. Due to the multitude of the axial grooves 26, there being preferably 180 on a 12½-inch diameter roll, when the rolls are rotating at production speed, there is in effect a fast hammering action between the rolls and the material passing between the rolls and absorbs at least some of the impact of the hammering action to set the desired pattern in the material. While this hammering movement is slight in amount, it is, nevertheless, quite definite and serves the purpose of hammering the design into the material, this hammering being due to the alternate relief of pressure whenever an axial groove 26 arrives at the nip between the rolls.

The fine ridges 22 of the top roll enter the valleys 23' of the bottom roll a distance substantially less than the depth of the axial grooves 26. The exact amount of the difference in depth between the valleys 23' and grooves 26 depends upon conditions, and particularly upon depth of the emboss which is desired and the caliper of the paper. As a result of the novel process it is possible to emboss a wide web of relatively heavyweight stock, such as a 30-lb. Kraft, without using a large diameter roll while still leaving a well-set design.

A fragment of the improved paper product, usually strong produced by the present invention is illustrated in FIG. 5. It is understood, however, that this is just a corner of a piece of toweling and that the same design appears uniformly throughout the paper product.

Figure 3:
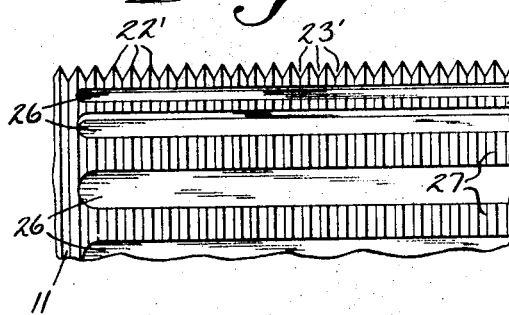
FIG. 3 is a fragmentary plan view showing a portion of the lower roll.

Embossed paper products are usually weaker in the cross direction as distinguished from the machine direction. With the present invention, by having the unembossed spaces 126 which extend in the cross direction there is added strength in this direction which makes it possible for embossing to be done without seriously impairing the strength in either direction. While the single or multiply paper stock to be embossed may be either plain or creped, the present invention has particular utility in connection with stock having transverse lines of light creping 127. With such stock the creping 127 extends in the same direction as the unembossed spaces or strips 126, giving added strength in the cross-machine direction (the machine direction being indicated by an arrow in FIG. 5). Also, the bars 122 on the product of FIG. 5 intersect the crepe lines 127 at right angles producing an extra softening action, the cross-machine strength of the sheet, however, being preserved because of the unembossed transverse spaces or strips 126. When paper materials are being embossed which are of lighter weight than the 30-lb. Kraft stock described herein, it may not be necessary to obtain the definite hammering action featured herein. For such lighter papers, the roller design of FIG. 3 may have utility regardless of the relative depth of the axial grooves 26 with respect to the depth of the valleys 23'.

It is also to be noted that, in the case of toweling or other item which is to be dispensed by withdrawal movement, the embossed bars 122 of FIG. 5, which extend in the dispensing direction shown by the arrow, create a situation where the contact between the two superimposed towel surfaces is usually only along the crests of the bars. Thus, during withdrawal movement, there is substantially less friction and easier dispensing.

Various changes and modifications may be made without departing from the spirit of the invention, and all of such changes are contemplated as may come within the scope of the claims.

I claim:

1. A method for continuously embossing a pattern in a paper web, said method comprising the steps of providing a pair of rollers having substantially parallel axes and a nip therebetween, continuously passing said web of paper between said pair of rotating rollers, continuously biasing said rollers together with a predetermined pressure while said web is between said rollers, providing circumferentially alternating strips having an embossing pattern and axial relief grooves at least coextensive in length with the width of said web in the outer periphery of one of said rollers, providing an interengaging embossing pattern in the other of said rollers, intermittently relieving the biasing pressure between said rotating rollers as said axial grooves are rotated to a position at the nip between said rollers, causing said rollers to jump together by said biasing pressure as said biasing pressure is being relieved at said relief grooves, and absorbing the impact of said jumping movement with said paper web to set said pattern in said paper web.

2. The method of claim 1 wherein said relieving step comprises periodically reducing the distance between the axes of said rotating rollers by said axial relief grooves so that said other roller is biased to jump towards said one roller whenever the distance between said axes is reduced, said jumping movement hammering said web at the nip between said rollers to set the pattern in said paper web.